United States Patent [19]

Weisenburger

[11] 3,710,299

[45] Jan. 9, 1973

[54] LOW PROFILE SOCKET FOR INTEGRATED CIRCUIT PACK

[75] Inventor: Lawrence P. Weisenburger, Ottsville, Pa.

[73] Assignee: Aries Electronic, Inc., Frenchtown, N.J.

[22] Filed: June 1, 1971

[21] Appl. No.: 148,663

[52] U.S. Cl. ............339/17 CF, 339/174, 339/252 R

[51] Int. Cl. ............H05k 1/02, H01r 13/02

[58] Field of Search ....174/DIG. 3; 339/17 C, 17 CF, 339/36, 44, 95 R, 174, 176 M, 176 MF, 176 MP, 252 R, 252 F, 258 R

[56] References Cited

UNITED STATES PATENTS

| | | | |
|---|---|---|---|
| 3,345,541 | 10/1967 | Cobaugh et al. | 339/17 CF |
| 3,602,875 | 8/1971 | Pierini | 339/17 CF |
| 3,605,075 | 9/1971 | Stofkooper | 339/176 MP |
| 3,573,617 | 4/1971 | Randolph | 339/17 CF |
| 3,248,687 | 4/1966 | Immel | 339/221 M |

FOREIGN PATENTS OR APPLICATIONS

| | | | |
|---|---|---|---|
| 1,143,341 | 2/1969 | Great Britain | 339/258 R |

*Primary Examiner*—Marvin A. Champion
*Assistant Examiner*—Lawrence J. Staab
*Attorney*—Thomas M. Marshall

[57] ABSTRACT

A low profile socket for accommodating an integrated circuit pack to be mounted on an integrated circuit board is characterized by having a U-shaped cross section, with the inside portion of each upstanding wall being defined by a plurality of 3-sided channels defined by partitions extending transverse to the longitudinal axis of the socket. A terminal pin is disposed at each channel, each terminal having a post section extending from the lower portion of the socket for passage through the integrated circuit board for connection to a conductor. The transverse width of the socket is sufficient to fully accommodate the main body of an integrated circuit pack, with the leads of the integrated circuit pack establishing electrical contact with the upper portions of the terminal pins through the open side of each channel. If desired, a molded insert generally rectangular in plan form, is adapted to be snapped into place between the integrated circuit pack and the partitions of the socket for use as both a cover and a means for retaining the pack in place. The total height of the composite assembly of the socket and the pack is approximately equal to the height of the socket.

8 Claims, 7 Drawing Figures

PATENTED JAN 9 1973 3,710,299

INVENTOR.
LAWRENCE P. WEISENBURGER

BY

Thomas M. Marshall
ATTORNEY

LOW PROFILE SOCKET FOR INTEGRATED CIRCUIT PACK

This invention relates to sockets for receiving electrical connections and, more particularly, to a socket for accommodating an integrated circuit pack in such manner as to minimize the height or profile of the composite assembly.

In the field of sophisticated electronics, miniaturized circuits are employed on an ever-increasing scale. The practices in the technology have evolved such that it is now common practice to use what has been known as integrated circuits, or physically small units containing an entire circuit (rather than a simple electric element), and to mount these integrated circuit packs or units to printed circuit boards and the like. In the early stages of development, it was the practice to solder the electrical contacts or terminals of the integrated circuit packs directly to designated points on the integrated circuit board. In other applications, the electronic circuit packs were mounted directly to a dielectric board with the terminals extending through the board for connection to conductors by wire wrapping or other termination techniques.

As the use of miniaturized circuits increased, there was a gradual evolutionary use of these techniques such that it is now common and desirable to mount electronic integrated circuit units to a terminal board or printed circuit board for easy removal and exchanging of individual units. Accordingly, intermediate sockets are now often used for receiving the pins or contacts of the integrated circuit pack. The sockets generally include a dielectric housing supporting electrical contacts for receiving the pins of the integrated circuit, said contacts having long pins, or posts, extending from the lower part of the housing for insertion through holes in the printed circuit board. The integrated circuit packs are mounted on top of the sockets, whereby the overall height of sub-assembly is equal to the total height of the socket and the integrated circuit pack. When the socket is mounted in place on the circuit board, the terminal posts extend to the back side of the printed circuit board, thereby providing terminal posts for receiving a wrapped wire or other common type of conductor connection for joining the integrated circuit to other components on the same or other circuit boards.

In addition to ease of assembly and reliability of the socket, one of the most paramount considerations is the geometrical size of the components mounted on an integrated circuit board. One of the basic considerations for the use of integrated circuits is the miniaturization of the entire assembly. The plan size of the sockets is generally governed by the size of the associated integrated circuits. At present, a conventional socket includes two rows of terminals, either 7 or 8 along each row, which are spaced at 0.100 inches, while the space between rows is 0.300. The total height of the composite assembly of socket and integrated circuit pack is the sum of the heights of the socket and the integrated circuit packs. It is an object of the present invention to provide a socket which substantially reduces the total height of the composite assembly of an integrated circuit pack and a socket, and, to this end, to overcome the shortcomings of the prior art devices to satisfy this critical requirement of achieving miniaturization of an integrated circuit panel.

SUMMARY OF THE INVENTION

In general, these and other objects of the invention are met by a socket which is generally U-shaped in cross section, with the upstanding legs of the socket being defined on the inside portion thereof by a plurality of partitions so as to define a plurality of 3-sided channels, the open side of which provides a means for establishing electrical contact between the leads of an integrated circuit pack (which is mounted within the envelope of the socket of the subject invention) and the terminal posts which extend from the channels in the socket to the other side of the integrated circuit board. In one embodiment of the subject invention, a molded insert, generally rectangular in plan form, is provided and is adapted to be snapped into place between the upper portion of the pack and the partitions of the socket. In addition to retaining the pack in place, the insert functions as a cover to prevent foreign matter from entering into the area of electrical contact between the pack and the terminals.

BRIEF DESCRIPTION OF THE DRAWINGS

For a better understanding of the invention, together with the further objects and advantages thereof, the following detailed description of preferred embodiments and the drawings may be referred to, in which:

Referring to FIGS. 1 and 2, the socket of the subject invention is designated by the numeral 10 and includes the combination of a housing 11 and terminals 12. In addition, an insert 13 may be provided, as more fully described hereinafter. The socket 10 is adapted to mount an integrated circuit pack 14 to an integrated circuit board 15, with the terminals of the socket extending through apertures 16 provided in the integrated circuit board. Conductors are attached to the portions of the terminals extending from the opposite side of the board 15 by wire wrapping or other known techniques for connecting a wire to a post.

The housing 11 is generally rectangular in plan form, corresponding in configuration to the standard geometry of an integrated circuit pack, and is generally U-shaped in configuration including an integral base 20 and upstanding sidewalls 21. The transverse spacing between the upstanding sidewalls is sufficient to enable the entire integrated circuit pack 14 to be positioned within the envelope of the housing 11 thereby decreasing the overall height of the combination of the integrated circuit pack 14 and the socket 10 in order to achieve the desired low profile of the assembly. As shown in FIG. 1, the leads 14' of integrated circuit pack 14 have been cut so as to reduce the overall height of the pack 14.

Figures 1, 2, 3, 4, 5, 6, 7:
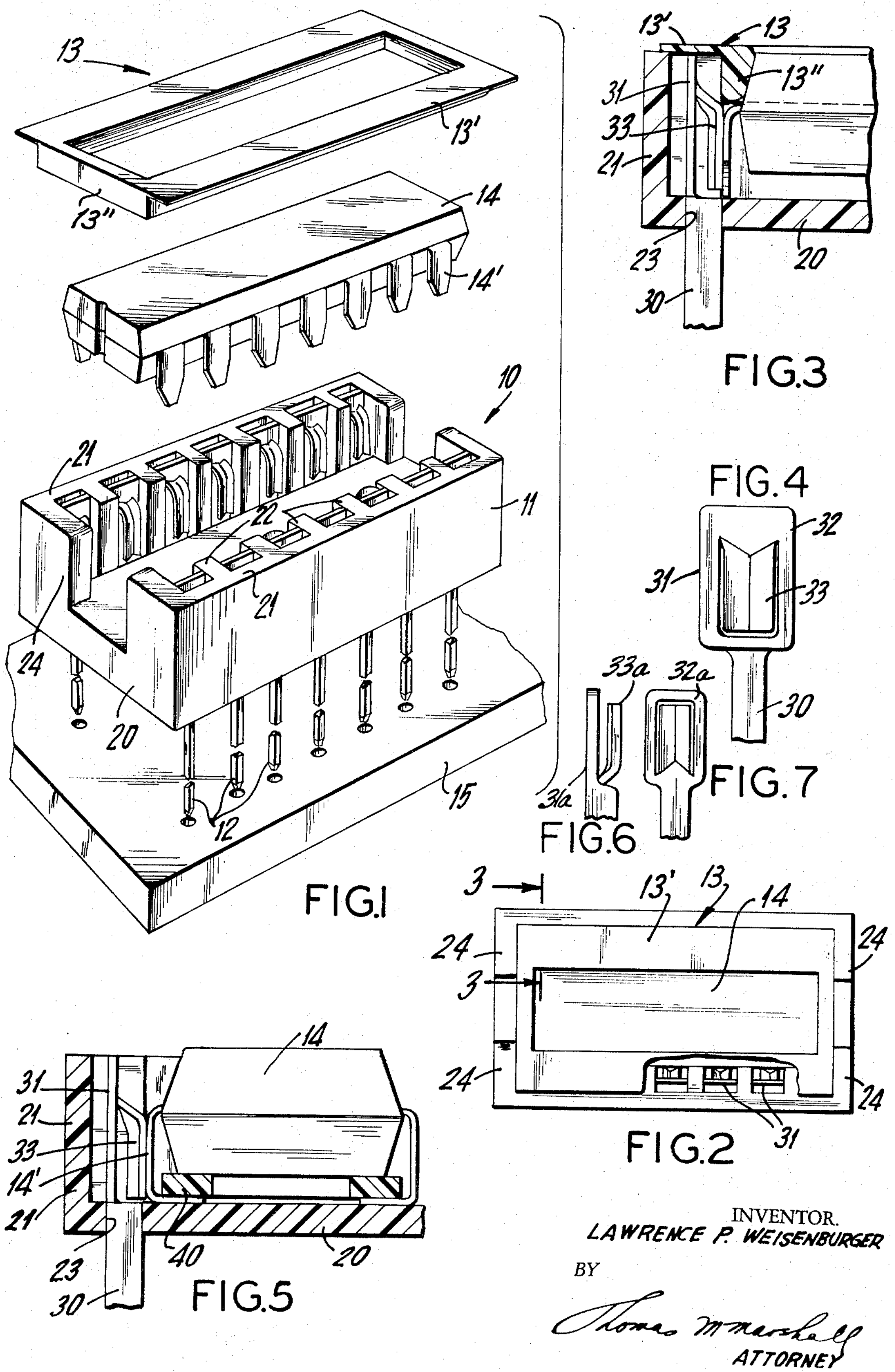
FIG. 1 is an exploded perspective view of the socket of the subject invention in combination with an integrated circuit pack and integrated circuit board.
FIG. 2 is a plan view, partially in section, of the composite assembly of an integrated circuit pack and the socket of the subject invention.
FIG. 3 is a view taken along lines 3—3 in FIG. 2.
FIG. 4 is a partial front view of a terminal for use with the socket of the subject invention.
FIG. 5 is a sectional view illustrating a modified form of socket of the subject invention.
FIG. 6 is a side view of an alternate form of terminal for use with the socket of the subject invention.
FIG. 7 is a front view of the alternate form of terminal illustrated in FIG. 6.

Each sidewall 21 is defined by a plurality of three-sided compartments formed by partitions 22. A channel 23 (see FIG. 3) is provided through the base 22 in each of the three-sided compartments formed by the partitions 22 for mounting of terminals 12. As illustrated, the channels 23 are preferably spaced laterally from the adjacent sidewall whereby the terminals may be deflected laterally when the integrated circuit pack 14 is inserted into the socket.

It is noted that the end walls 24 of the socket 10 are slightly larger than the partitions 22 in order to prevent longitudinal shifting of the integrated circuit pack in the socket.

Preferably, the socket 10 is formed of a molded plastic dielectric material, such as glass filled nylon having sufficient strength for retaining the terminals in place. As shown in FIG. 3, each terminal 12 extends through the channel 23 and is held in position by the base 20.

Referring to FIGS. 3 and 4, each terminal 12 is made of a resilient electrically conductive material, such as phosphor, bronze or copper metal, and includes a terminal post 30 and a spring contact portion 31. The terminal post 30 may be square in cross section, e.g., 0.025 inches square, while the spring contact 31 includes an enlarged flat surface 32 from which is cantilevered V-shaped contact portion 33 extending from a point adjacent the upper end of the terminal. As shown in FIG. 2, the two ends of each V-shaped contact portion 33 are adapted to face and contact the leads 14′ of the integrated circuit pack 14, to achieve a redundant and more reliable connection. As previously mentioned, the leads 14′ are shown severed in order to reduce the overall height of the integrated circuit pack 14 and in order to facilitate the positioning of the pack within the confines of the housing 11. Alternatively, the leads 14′ may be bent under the pack. FIGS. 6 and 7 illustrate an alternate form of terminal wherein V-shaped contact portion 33*a* extends from a point adjacent the lower end of the enlarged flat surface 32*a* of spring contact portion 31*a* of the terminal. The terminal post portion of the alternate form of terminal is designated by the numeral 30*a*.

The mechanical and electrical connection between the contact portions 33 of the terminals and the leads 14′ of the pack is illustrated in FIG. 3. When fully assembled, the spring contact forces between the terminals 12 and the leads 14′ of pack 14 are sufficient to form an electrical connection and in addition to mechanically hold the pack within the socket. Since the channels 23 are spaced laterally from the adjacent sidewall 24 of the socket, the enlarged flat surface 32 of each terminal 12 may deflect outwardly thereby relieving any overstressing between the spring contact of V-shaped portion 33 and the associated lead 14′ of the integrated circuit pack. In order to securely hold the terminals 12 within the channels 23, the terminals 12 are press fit into said channels 23.

In order to assemble the socket of the subject invention, the terminals 31 are first press fitted within the channels 23 of housing 11, with the free ends of the V-shaped spring contact portions 31 facing toward the center of the socket. The leads 14′ of the integrated circuit pack 14 are either bent or severed so that the entire pack 14 may be accommodated within the socket 10. Because of the specific configuration of the socket 10, the resulting assembly of the integrated circuit pack provides an extremely low profile configuration with the spring contact pressure between the terminals 12 and the leads of the integrated circuit pack 14 providing a positive mechanical and electrical connection. Conductors extending from other components in the assembly are then connected to the terminal posts 30 of the pins 12.

In a modified form of the invention, the socket additionally includes insert 13 which is generally rectangular in plan form conforming to the plan form of the integrated circuit pack 14, and which may also be made of molded plastic. As shown in FIGS. 1 and 3, the insert 13 includes a skirt portion 13′ and a depending tapered portion 13″ which conforms to the tapered body of the integrated circuit pack 14. The insert 13 is adapted to be placed over the integrated circuit pack 14, with the tapered portion 13″ being wedged between the upper sloping surface of the body of the integrated circuit pack 14 and the ends of the partitions 22, while the skirt portions 13′ overlay and cover the 3-sided compartments formed by the partitions 22. By this arrangement, the insert 13 snaps into place thereby reinforcing the positive mechanical connection between the pack 14 and the socket 10, while simultaneously preventing foreign matter such as dust from entering the three-sided compartments formed by the partitions 22. In addition to functioning as an effective dust cap, the skirt 13′ also prevents the inadvertent placing of a probe into the socket.

FIG. 5 illustrates an arrangement for effecting the bending of the leads 14′ of the integrated circuit pack 14 in those situations where there is a possibility that the pack 14 may be removed at a future time for use in a conventional socket. For this purpose, a generally rectangular member 40 is provided, and is placed at the lower end of the integrated circuit pack 14 preparatory to bending the leads 14′ inwardly. Besides acting as an anvil about which the leads are bent, member 40 functions to protect the leads in their bent position while being handled by the personnel assembling the integrated circuit board. If desired, suitable ribs may be provided along the lower surface of member 40 to maintain alignment of the bent leads 14′ and to retain same in position.

It should thus be appreciated that the invention offers many new advantages. It employs a superior receptacle, capable of adapting a variety of integrated circuit pin connections; provides a low profile connection for integrated circuit packs; provides extreme reliability of electrical connection between the leads of the pack and the terminal pins; and a positive engagement of the pack within the socket thereby enhancing the ability of the assembly to withstand shock and vibration loadings; all of these features existing in a single socket assembly that is dimensionally smaller in profile than the prior art sockets.

Although the invention has been described with specific reference to a preferred embodiment, numerous modifications and variations, both in form and in detail, might occur to those skilled in the art. For example, the invention applies to sockets having one or more contacts, as well as to sockets of various contact arrangements and geometries. Accordingly, all such modifications and variations are intended to be included within the scope and spirit of the appended claims.

What is claimed is:

1. A low profile socket assembly for receiving electronic components and providing terminal connections thereto comprising:

an elongated housing of U-shaped cross-section including a base and two upstanding walls, a plurality of partitions extending inwardly from each upstanding wall to define a plurality of 3-sided compartments open to the center of the housing, said base including a plurality of channels extending therethrough, one channel located in each compartment, with the transverse width of the housing being sufficient to accomodate the electrical components;

a plurality of terminals, each comprised of a terminal post received within a channel and protruding from the underside of the base to provide a terminal external to the housing, and of an integral receptacle extending at least partially from the upper surface of the base; and a rectangularly shaped insert adapted to maintain the electrical components within the socket assembly and to close the upper openings of the 3-sided compartments to prevent the ingress of foreign matter therein, which insert includes a skirt portion for covering the 3-sided compartments, and a depending wedge portion adapted to be snapped into place between the partitions of the sockets assembly, and an electronic component disposed in the socket assembly.

2. A low profile socket assembly as in claim 1 in which the terminals are press fitted into the channels.

3. A low profile socket assembly as in claim 1 wherein the integral receptacle of the each terminal includes a V-shaped contact area.

4. A low profile socket assembly as in claim 1 wherein each upstanding wall includes an inside surface disposed generally parallel to the center line of the socket assembly, and wherein the channels are spaced transversely from said inside surface of the upstanding walls to enable the receptacle portion of the terminal to flex away from the longitudinal center line of the socket assembly.

5. A low profile socket assembly as in claim 1 wherein the end partitions of the socket assembly are of greater width than the intermediate partitions to aid in preventing the electronic components from shifting longitudinally in the socket assembly.

6. A low profile socket assembly for receiving electronic components and providing terminal connections thereto comprising:

an elongated housing of U-shaped cross-section including a base and two upstanding walls, a plurality of partitions extending inwardly from each upstanding wall to define a plurality of 3-sided compartments open to the center of the housing, said base including a plurality of channels extending therethrough, one channel located in each compartment; and a plurality of terminals, each comprised of a terminal post received within a channel and protruding from the underside of the base to provide a terminal external to the housing, and of an integral receptacle extending at least partially from the upper surface of the base, which integral receptacle portion of the terminal includes a flattened portion from which is cantilevered a V-shaped contact portion extending generally parallel to said flattened portion and extending from the lower end thereof.

7. A conductive electrical terminal for receiving the lead of electrical components, comprising:

an integral receptacle including a flatted portion from which is cantilevered a V-shaped contact member, with the free ends of the V extending away from the lower portion of said flattened portion; and an elongated terminal post extending from the lower portion of said integral receptacle.

8. A conductive electrical terminal for receiving the lead of electrical components, comprising:

an integral receptacle including a flattened portion from which is cantilevered a V-shaped contact member, with the free ends of the V extending from the upper portion of the flattened portion laterally away from and out of the plane of said flattened portion; and an elongated terminal post extending from the lower portion of said integral receptacle.

* * * * *